United States Patent
Grün et al.

(10) Patent No.: US 11,603,803 B2
(45) Date of Patent: *Mar. 14, 2023

(54) COUPLING ARRANGEMENT

(71) Applicant: Purem GmbH, Neunkirchen (DE)

(72) Inventors: Matthias Grün, Altbach (DE); Markus Birgler, Wernau (DE); Markus Lory, Stuttgart (DE); Andreas Wacker, Plochingen (DE); Annika Zeumer, Wernau (DE); Ralph Schenk, Stuttgart (DE); Miljenko Novosel, Stuttgart (DE)

(73) Assignee: Purem GmbH, Neunkirchen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/579,394

(22) Filed: Jan. 19, 2022

(65) Prior Publication Data

US 2022/0228533 A1 Jul. 21, 2022

(30) Foreign Application Priority Data

Jan. 20, 2021 (DE) ..................... 10 2021 101 134.5

(51) Int. Cl.
*F02D 9/10* (2006.01)
*F02M 26/70* (2016.01)
(Continued)

(52) U.S. Cl.
CPC ............. *F02D 9/1065* (2013.01); *F02D 9/04* (2013.01); *F02D 9/10* (2013.01); *F02D 9/107* (2013.01);
(Continued)

(58) Field of Classification Search
CPC .......... F02D 9/1065; F02D 9/04; F02D 9/107; F02D 9/10; F02M 26/70; F16D 3/06; F16K 1/22; F16K 31/043
(Continued)

(56) References Cited

U.S. PATENT DOCUMENTS 6,918,401 B1 * 7/2005 Vanderveen .......... F02D 9/1065
251/308
2011/0297862 A1 * 12/2011 Womann ................... F02D 9/04
251/305
(Continued)

FOREIGN PATENT DOCUMENTS

DE 10 2013 103 105 A1 10/2014
DE 102015222609 A1 * 5/2017 ............... F02D 9/04
(Continued)

*Primary Examiner* — Mahmoud Gimie
(74) *Attorney, Agent, or Firm* — Walter Ottesen, P.A.

(57) ABSTRACT

A coupling arrangement is disclosed for the rotational coupling of a drive element of a pivoting drive of an exhaust-gas flap for the exhaust-gas flow of a combustion engine to a pivot shaft rotatable about a pivot axis. A first coupling element has a coupling region coupled to a pivot shaft for rotation about the pivot axis. A preload element generates a force acting on the first coupling element and the second coupling element in a peripheral direction with respect to one another and generates a force acting in an axial direction between the coupling elements. One of the coupling elements includes two radially outwardly extending rotational coupling projections and the other coupling element includes a rotational coupling cutout receiving the projection. The one coupling element is held axially on the other coupling element by the preload element to prevent the projections from moving out of the cutouts.

19 Claims, 3 Drawing Sheets

(51) Int. Cl.
*F16D 3/06* (2006.01)
*F16K 1/22* (2006.01)
*F16K 31/04* (2006.01)
*F02D 9/04* (2006.01)

(52) U.S. Cl.
CPC ............... *F02M 26/70* (2016.02); *F16D 3/06* (2013.01); *F16K 1/22* (2013.01); *F16K 31/043* (2013.01)

(58) Field of Classification Search
USPC ........................................................ 123/337
See application file for complete search history.

(56) References Cited

U.S. PATENT DOCUMENTS

| | | |
|---|---|---|
| 2017/0284310 A1 | 10/2017 | Delplanque et al. |
| 2018/0238209 A1 * | 8/2018 | Suzuki ................... F01N 1/165 |
| 2020/0095946 A1 | 3/2020 | Zeumer et al. |
| 2021/0246841 A1 | 8/2021 | Edler et al. |

FOREIGN PATENT DOCUMENTS

| | | | | |
|---|---|---|---|---|
| DE | 10 2015 202 211 B4 | 6/2017 | | |
| DE | 10 2017 105 889 A1 | 10/2017 | | |
| DE | 102017222465 A1 * | 6/2019 | ............... | F02D 9/04 |
| DE | 10 2011 107 088 C5 | 10/2019 | | |
| DE | 10 2018 123 403 A1 | 3/2020 | | |
| DE | 102014118492 B4 * | 5/2020 | ............. | F01N 13/08 |
| DE | 10 2020 103 420 A1 | 8/2021 | | |

* cited by examiner

COUPLING ARRANGEMENT

CROSS REFERENCE TO RELATED APPLICATION

This application claims priority of German patent application no. 10 2021 101 134.5, filed Jan. 20, 2021, the entire content of which is incorporated herein by reference.

TECHNICAL FIELD

The present disclosure relates to a coupling arrangement for the coupling of a drive shaft of a pivoting drive of an exhaust-gas flap for the exhaust-gas flow of an internal combustion engine to a pivot shaft that is rotatable about a pivot axis and that supports a flap plate.

BACKGROUND

A coupling arrangement of this kind is known from DE 10 2015 202 211 B4. In the case of the known coupling arrangement, the coupling element which is coupled to the pivot shaft for conjoint rotation has, proceeding from the coupling region thereof that is coupled to the pivot shaft, two rotational coupling arms which extend substantially axially in the direction of the pivoting drive. A rotational coupling cutout is provided in each of the rotational coupling arms by a hole-like rotational coupling opening. Two rotational coupling projections extend radially outward from a coupling region of the coupling element that is coupled to the drive element of the pivoting drive for conjoint rotation and engage into the hole-like rotational coupling openings of the coupling element that is coupled to the pivot shaft. The hole-like rotational coupling openings formed in the rotational coupling arms are completely closed in terms of periphery, such that they are closed in particular also in the direction of the coupling element that is coupled to the pivoting drive and thus engage axially behind the rotational coupling projections engaging therein. The coupling element having the two rotational coupling projections is thus arranged directly on the coupling element having the two rotational coupling openings so as to be movable axially and rotationally in a limited manner, such that the axial positively locking engagement provided directly by the two coupling elements and acting directly between them has the effect that the two coupling elements are held captively against one another since the rotational coupling projections cannot move axially out of the rotational coupling openings that receive them.

SUMMARY

It is an object of the present disclosure to provide a coupling arrangement which, while having a simple construction and simple producibility, ensures that two coupling elements thereof are held captively against one another.

According to the disclosure, an object is achieved by a coupling arrangement for the rotational coupling of a drive element of a pivoting drive of an exhaust-gas flap for the exhaust-gas flow of an internal combustion engine to a pivot shaft that is rotatable about a pivot axis.

The coupling arrangement includes:
  a first coupling element having a coupling region which is to be coupled to a pivot shaft for conjoint rotation about the pivot axis,
  a second coupling element having a coupling region which is to be coupled to a drive element for conjoint rotation about the pivot axis,
  a preload element for generating a force which acts on the first coupling element and the second coupling element substantially in a peripheral direction with respect to one another and for generating a force which acts in an axial direction between the first coupling element and the second coupling element,
  one coupling element of the first coupling element and the second coupling element including at least two radially outwardly extending rotational coupling projections, and the other coupling element of the first coupling element and the second coupling element including, so as to be assigned to each rotational coupling projection of the one coupling element, a rotational coupling cutout which receives the rotational coupling projection.

The coupling arrangement is distinguished in that each rotational coupling cutout is open axially in the direction away from the coupling region of the other coupling element, and in that the one coupling element is held axially on the other coupling element by the preload element so as to prevent the rotational coupling projections from moving out of the rotational coupling cutouts that receive them.

In the construction of a coupling arrangement according to the disclosure, the holding action of the two coupling elements against one another is achieved not by positively locking engagement acting between them but by the two coupling elements being held against one another by the preload element acting between them. The preload element ensures that the rotational coupling projections which engage into the rotational coupling cutouts but which are fundamentally able to move axially out of them are held in the rotational coupling cutouts, even if the coupling arrangement is not held in an axially clamped manner between the assemblies to be coupled for conjoint rotation via the coupling arrangement. This simplifies the production process of the coupling arrangement significantly, since each of the coupling elements can already be provided in the shaping to be provided for the assembled state, in particular in the region in which rotational coupling projections or rotational coupling cutouts are formed, before being joined together with the other coupling element and it is not necessary, as is the case in the prior art cited in the introduction, for one of the coupling elements to be deformed in order to thereby generate the positively locking engagement which is required for the captive retention and which acts directly between the coupling elements.

In order to ensure that the two coupling elements are held against one another with defined positioning even in the state in which the coupling arrangement is not clamped axially between the assemblies to be coupled via the coupling arrangement, it is proposed that when the preload element is in a substantially completely axially relaxed state, the rotational coupling projections are positioned so as to engage into the rotational coupling cutouts assigned thereto.

In order for the rotational forces which are to be transmitted to be distributed uniformly in the peripheral direction, two rotational coupling projections which extend away from one another in a substantially diametrically opposed manner with respect to the pivot axis may be provided on the one coupling element.

Furthermore, the rotational coupling projections may extend radially outward from the coupling region of the one coupling element.

The coupling region of the one coupling element, which is provided for example in the form of a sheet-metal component, may be of substantially plate-like form in order to obtain a construction that is easy to realize.

In one configuration that is easy to realize, two rotational coupling fingers which extend substantially axially in the direction away from the coupling region of the other coupling element and which delimit between them a rotational coupling cutout that is open axially in the direction away from the coupling region of the other coupling element may be provided on the other coupling element for the purpose of providing a respective rotational coupling cutout. In this case, the structure can also be achieved in a simple manner in that the other coupling element is also provided in the form of a sheet-metal component.

For a stable configuration, a rotational coupling arm which extends substantially axially away from the coupling region of the other coupling element and which has two rotational coupling fingers may be provided on the other coupling element for the purpose of providing a respective rotational coupling cutout.

For low heat transfer between the coupling region of the other coupling element and the rotational coupling arms, a cutout which is preferably T-shaped or/and which extends in the direction of the assigned rotational coupling arm may be formed in the coupling region of the other coupling element so as to be assigned to at least one, preferably each, rotational coupling arm.

The coupling region of the other coupling element may also be of substantially plate-like form.

In order to be able to provide a simple way of generating the forces that act axially and in the peripheral direction between the two coupling elements, it is proposed that the preload element includes a preload spring having a first support region which is supported at least in a first peripheral direction with respect to the first coupling element and at least axially in the direction of the second coupling element, and having a second support region which is supported at least in a second peripheral direction, opposite to the first peripheral direction, with respect to the second coupling element and at least axially in the direction of the first coupling element.

In this case, the preload spring and the two coupling elements can be held together in a defined manner in that the first support region includes a holding limb, which is engaged over axially and in the peripheral direction by a holding region of the first coupling element, of the preload spring, or/and in that the second support region includes a holding limb, which is engaged over axially and in the peripheral direction by a holding region of the second coupling element, of the preload spring.

In order for the preload spring to be held stably on the coupling elements, the holding region of the first coupling element may include, on an outer peripheral region of the coupling region of the first coupling element, a holding lug which extends in a curved manner axially and in the peripheral direction, or/and the holding region of the coupling region of the second coupling element may include, on an outer peripheral region of the coupling region of the second coupling element, a holding lug which extends in a curved manner axially and in the peripheral direction.

In order to be able to hold the preload spring, in interaction with the two coupling elements, axially and in the peripheral direction in each case for the purpose of generating the peripheral preload and the axial holding-together action, it is proposed that the holding lug on the coupling region of the first coupling element is curved axially and in the peripheral direction in a manner substantially opposite to the holding lug on the coupling region of the second coupling element.

In one reliably acting configuration that is easy to realize in terms of structure, the preload spring may be a helical spring, and each holding limb may be provided by a substantially radially outwardly extending winding end region of the preload spring.

For peripheral support of the two coupling elements against one another, which is required for the transmission of the rotational forces, a peripheral support region may be provided on each rotational coupling projection, and each rotational coupling cutout may be delimited in the peripheral direction by a counterpart peripheral support region, the peripheral support region of each rotational coupling projection received in a rotational coupling cutout being preloaded by the preload element so as to abut against the counterpart peripheral support region of the rotational coupling cutout receiving a respective rotational coupling projection.

In order to achieve defined relative positioning of the two coupling elements substantially transversely with respect to the pivot axis, a radial support region which substantially radially supports the one coupling element with respect to the other coupling element may be provided on the other coupling element so as to be assigned to at least one rotational coupling projection, in the peripheral direction, on at least one side of the rotational coupling projection.

For a coupling to the assemblies to be coupled together that is easy to realize but nevertheless ensures defined positioning, it is proposed that the coupling region of the first coupling element has a positively locking engagement formation for rotational coupling to the pivot shaft, or/and that the coupling region of the second coupling element has a positively locking engagement formation for rotational coupling to the drive element. Alternatively or in addition, at least one of the coupling elements may be coupled to the assembly to be coupled therewith by frictionally locking engagement, for example interference fit, or/and by material cohesion, for example welding.

The disclosure also relates to an exhaust-gas flap, in particular for the exhaust-gas flow of an internal combustion engine, including a flap plate which is supported, in the interior of a flap pipe, on a pivot shaft that is rotatable about a pivot axis, and also a pivoting drive with a drive element, further including a coupling arrangement constructed in accordance with the disclosure for the rotational coupling of the pivot shaft to the drive element.

BRIEF DESCRIPTION OF THE DRAWINGS

The invention will now be described with reference to the drawings wherein.

DESCRIPTION OF THE PREFERRED EMBODIMENTS

Figure 1:
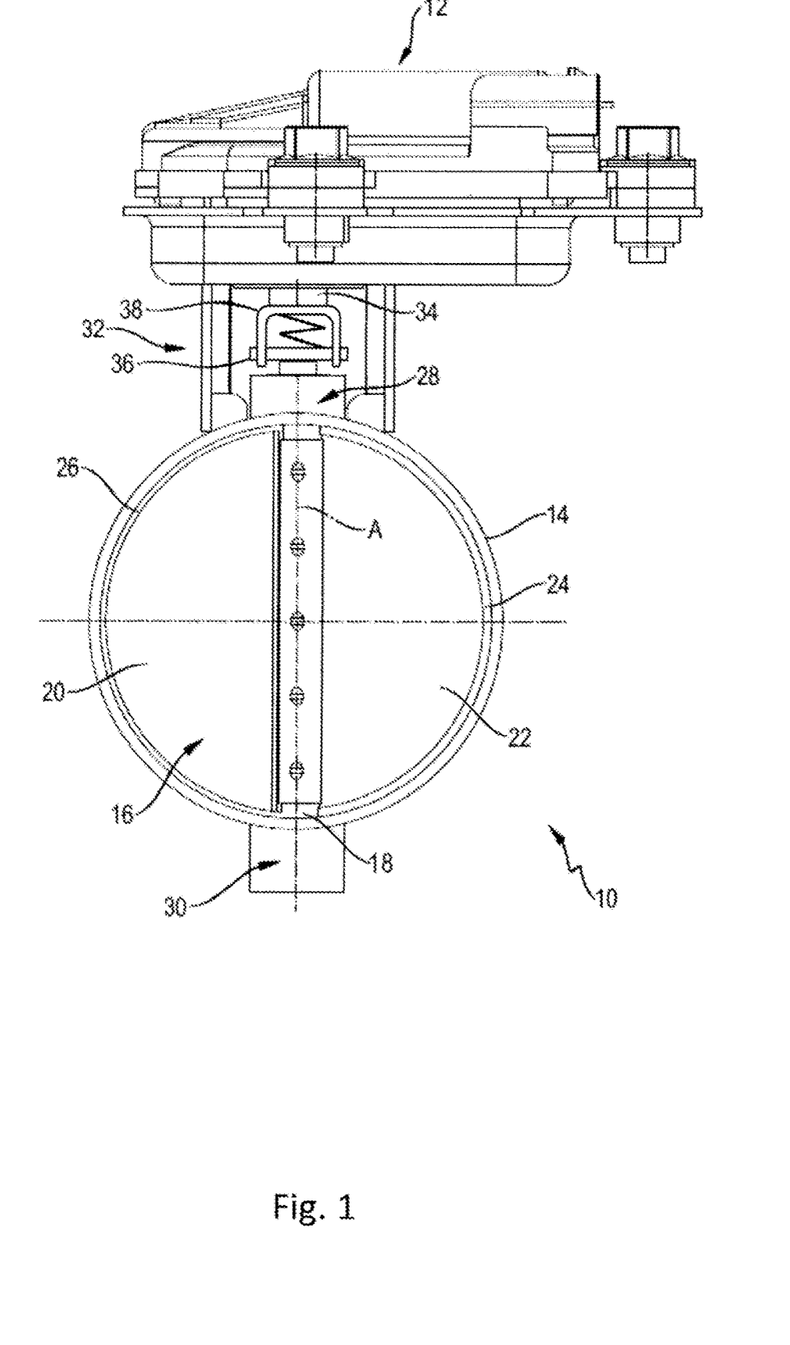
FIG. 1 shows an exhaust-gas flap for the exhaust-gas flow of an internal combustion engine.

FIG. 1 shows a side view of an exhaust-gas flap which is denoted generally by 10 and which can be used for example in an exhaust-gas system of an internal combustion engine and which has a flap drive 12. The exhaust-gas flap 10 includes a flap pipe 14 in which a flap plate denoted generally by 16 is supported, pivotably about a pivot axis A, on a pivot shaft 18. The flap plate 16 includes two flap wings 20, 22 which, in the case of a flap plate 16 positioned in a shut-off position, lie against wing stops 24, 26 provided on the inner circumference of the flap pipe 14.

The pivot shaft 18 is, at its two axial end regions 28, 30, supported so as to be rotatable or pivotable relative to the flap pipe 14 about the pivot axis A via respective bearing arrangements. In its first axial end region 28, the pivot shaft 18 is coupled via a coupling arrangement 32 described below to a drive element 34 of the flap drive 12, for example a drive shaft, for conjoint rotation about the pivot axis A.

Figure 2:
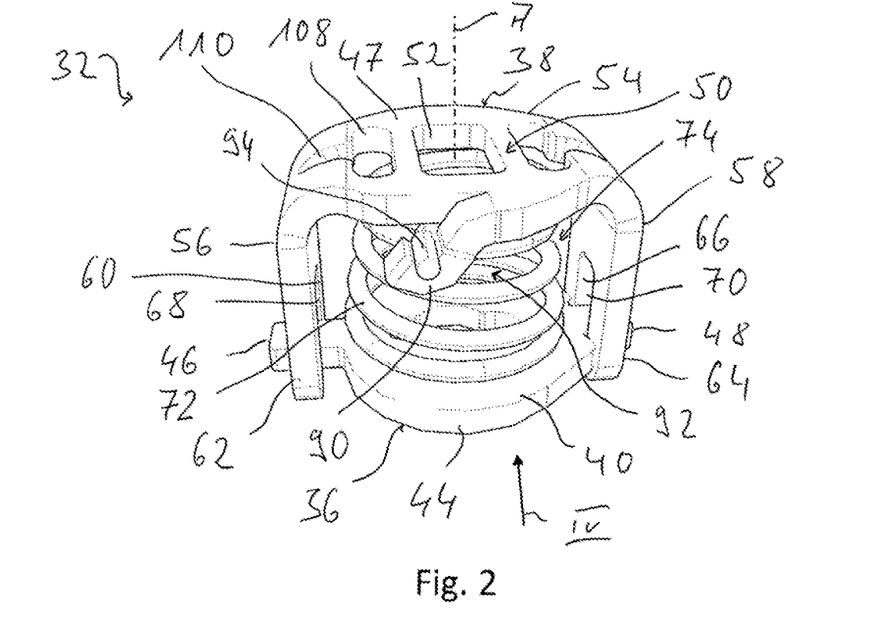
FIG. 2 shows a perspective view of a coupling arrangement for an exhaust-gas flap.
Figure 3:
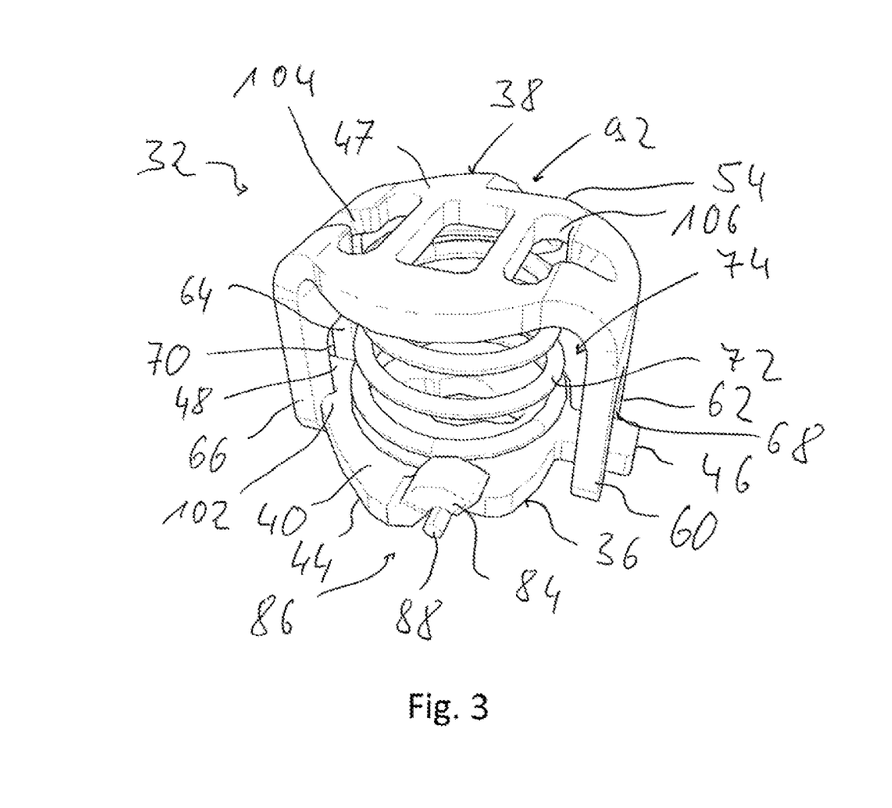
FIG. 3 shows a side view of the coupling arrangement of FIG. 2.
Figure 4:
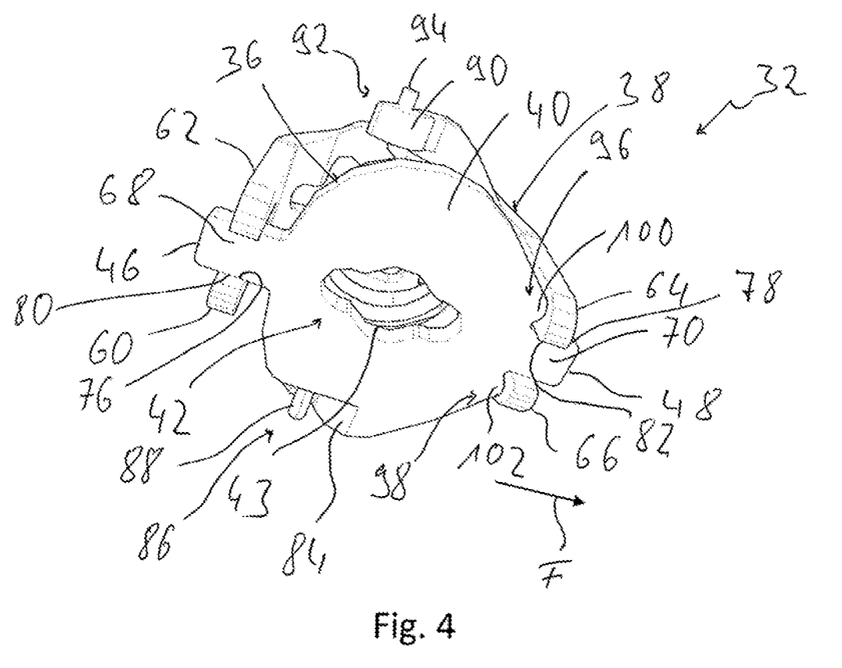
FIG. 4 shows a view of the coupling arrangement of FIG. 2 in viewing direction IV in FIG. 2.

The coupling arrangement 32 is illustrated in detail in FIGS. 2 to 4. The coupling arrangement 32 includes a first coupling element 36 which is rotationally conjointly coupled to the pivot shaft 18, and a second coupling element 38 which is rotationally conjointly coupled to the drive element 34 of the flap drive 12. The first coupling element 36, which is provided for example in the form of a sheet-metal part, includes a plate-like coupling region 40 having a positively locking engagement formation 42 formed in a central region. The positively locking engagement formation is provided by an opening 43 having a non-rotationally symmetrical opening cross section, a correspondingly shaped portion of the pivot shaft 18 being able to be positioned so as to engage into the opening. On two regions of the coupling region 40 that are arranged diametrically opposite one another with respect to the pivot axis, two rotational coupling projections 46, 48 extend radially outward from an outer peripheral region 44 of the coupling region in a diametrically opposed manner with respect to one another.

The second coupling element 38, which is likewise provided for example in the form of a sheet-metal component, includes a plate-like coupling region 47 having a positively locking engagement formation 50 formed in a central region thereof. The positively locking engagement formation may also have an opening 52 having a non-rotationally symmetrical opening cross section with respect to the pivot axis A, a correspondingly shaped region of the drive element 34 being able to be positioned so as to engage into the opening. On an outer peripheral region 54 of the plate-like coupling region 47 of the second coupling element 38, regions lying diametrically opposite one another with respect to the pivot axis A have coupling arms 56, 58 that extend from the coupling region 47 substantially in the direction of the pivot axis A toward the first coupling element 36. Two rotational coupling fingers 60, 62 and 64, 66, respectively, which extend axially in the direction of the first coupling element 36, are provided on each of the two rotational coupling arms 56, 58. The rotational coupling fingers 60, 62 and 64, 66, respectively, that are provided on a respective rotational coupling arm 56, 58 delimit between them, in the peripheral direction, a respective rotational coupling cutout 68, 70. The two rotational coupling cutouts are open axially in the direction away from the coupling region 47 of the second coupling element 38 such that, when the coupling arrangement 32 is being assembled, the two rotational coupling projections 46, 48 of the first coupling element 36 can be axially introduced into the rotational coupling cutout 68, 70 until they are held in the peripheral direction between the rotational coupling fingers 60, 62 and 64, 66, respectively, that delimit a respective rotational coupling cutout 68, 70. On the second coupling element 38, however, there are no portions engaging behind that side of the first coupling element which faces away from the coupling region 47 of the second coupling element 38 and thus having the effect of axially holding together the two coupling elements 36, 38 or producing axially positively locking engagement thereof.

The coupling arrangement 32 further includes a preload element 74 in the form of a preload spring 72, for example in the form of a helical spring having a plurality of spring windings. The preload spring 72 is arranged substantially between the two coupling elements 36, 38 and is axially supported on the mutually facing axial sides of the coupling regions 40, 47 of the two coupling elements 36, 38. The preload element 74 generates a peripheral force which acts on the two coupling elements 36, 38 in the peripheral direction with respect to one another for movement purposes. In the illustration of FIG. 4, the peripheral force acts on the first coupling element 36 in the counter-clockwise direction, such that the peripheral support regions 76, 78 of the first coupling element 36 which are formed on the two rotational coupling projections 46, 48 thereof are preloaded so as to abut against counterpart peripheral support regions 80, 82 which are formed on the rotational coupling fingers 60 and 64, respectively, and which thus delimit the rotational coupling cutouts 68, 70 in the peripheral direction. It should be pointed out that the peripheral support regions 76, 78 and the counterpart peripheral support regions 80, 82 may be provided by area regions of the two coupling elements 36, 38 that can be brought into abutment against one another.

In order to generate the preload force which acts on the coupling elements 36, 38 in the peripheral direction with respect to one another and via which the rotational coupling projections 46, 48 are preloaded so as to abut against the rotational coupling fingers 60, 64, the first coupling element 36 has a holding region 86, which is provided by a holding lug 84, on the outer peripheral region 44 of the coupling region 40. The holding lug 84 may be provided for example by bending out of the plane of the coupling region 40 of the first coupling element 36 and engages over a substantially radially outwardly protruding holding limb 88, which provides a support region of the preload element 74, of the preload spring 72 axially completely on a peripheral side thereof and substantially completely in the peripheral direction on the axial side facing the second coupling element 38. FIG. 3 shows that the holding lug 84 may also engage axially in part over the other peripheral side of the holding limb 88, in order to achieve defined mounting of the holding limb 88, which is provided by a radially outwardly extending winding end region of the preload spring 72, in both peripheral directions.

A holding region 92, which is also provided by a holding lug 90, for a holding limb 94 of the preload spring 72 is provided on the second coupling element 38, the holding limb being provided by a radially outwardly extending winding end region which forms a further support region of the preload element 74 at the other axial end of the preload spring 72. The holding lug 90 engages over the holding limb 94 in an axially complete manner and in the peripheral direction on that side of the holding limb 94 which axially faces the first coupling element 36. The holding lug 90, which may also be provided by bending out of the plane of the coupling region 47 of the second coupling element 38, may also engage axially in part over the other peripheral side of the holding limb 94, so that here, too, defined positioning of the holding limb 94 in both peripheral directions is ensured.

The two holding regions 86, 92 or, respectively, the holding lugs 84, 90 thereof engage over the holding limbs 88, 94 assigned thereto in mutually opposite axial directions and peripheral directions. In this way, firstly the possibility of using preloaded installation of the preload spring 72 to generate the peripheral force or tangential force which preloads the two coupling elements 36, 38 in the peripheral direction with respect to one another is provided. At the same time, the possibility of coupling the two coupling elements 36, 38 to one another via the preload spring 72 for the purpose of transmitting an axial force is provided. It is recognized that the preload spring 72, in its two axial end regions, is not only held on the coupling elements 36, 38 via the respective holding regions 86, 92 by way of its holding limbs 88, 94 but is axially supported on the coupling regions 40, 47 of the coupling elements by way of its respective last windings. In the case that the two coupling elements 36, 38 move toward one another, the preload spring 72 can thus generate an axial force which forces the coupling elements axially apart from one another, such that, in the installed state, the coupling arrangement 32 held in an axially compressed manner between the pivot shaft 18 and the drive element 34 generates a force action that forces the pivot shaft 18 axially in the direction away from the drive element 34, as a result of which the pivot shaft 18 is held with defined axial positioning in the flap pipe 14.

By virtue of the fact that the holding limbs 88, 94 are engaged over in the peripheral direction by the holding lugs 84, 90 respectively assigned thereto on the side facing the respective other coupling element, the preload spring 72 also generates an axial force between the two coupling elements 36, 38 in the direction toward one another if a force which moves the rotational coupling projections 46, 48 of the coupling element 36 axially out of the assigned rotational coupling cutouts 68, 70 acts on the coupling element. In a substantially completely relaxed state of the preload spring 72, the state being illustrated in FIGS. 2 to 4, the rotational coupling projections 46, 48 of the first coupling element 36 are positioned so as to engage into the assigned rotational coupling cutouts 68, 70, and the peripheral support regions 76, 78 of the first coupling element are held so as to abut against the counterpart peripheral support regions 80, 82 by the peripheral force generated via the preload spring 72. On account of the axial force action of the preload spring 72, an axial force which prevents the rotational coupling projections 46, 48 from moving axially out of the rotational coupling cutouts 68, 70 that receive them is thus provided in addition to the frictionally locking engagement between the peripheral support regions 76, 78 and counterpart peripheral support regions 80, 82 that bear against one another. Although the axially open rotational coupling cutouts 68, 70 have the effect that the two coupling elements 36, 38 are thus not held directly against one another so as to be movable axially in a limited manner, a captive retention means for the two coupling elements 36, 38 is provided in an indirect manner, namely by the preload spring 72 connected to the two coupling elements 36, 38, and prevents the two coupling elements 36, 38 from detaching from one another prior to the integration in the exhaust-gas flap 10 illustrated in FIG. 1.

Since the captive retention function is provided by the preload spring 72, the rotational coupling cutouts 68, 70 receiving the two rotational coupling projections 46, 48 may be of axially open form, which simplifies the assembly of the coupling arrangement 32 considerably. Each of the two coupling elements 36, 38 may be provided in the configuration illustrated in the figures, in particular in the region of the rotational coupling projections 46, 48 or the rotational coupling arms 56, 58 and the rotational coupling fingers 60, 62, 64, 66 provided thereon, prior to the joining together with the respective other coupling element. It is therefore not necessary for any shaping measures to be carried out during the assembly of the coupling arrangement 32 in order to be able to position the two rotational coupling projections 46, 48 so as to engage into the rotational coupling cutouts 68, 70 that receive them. It is merely necessary for the two coupling elements 36, 38, with a preload spring 72 positioned between them, to be rotated with respect to one another such that the rotational coupling projections 46, 48 are aligned in the peripheral direction with the rotational coupling cutouts 68, 70 that receive them, and then be moved axially toward one another until the two rotational coupling projections 46, 48 are positioned so as to engage into the rotational coupling cutouts 68, 70. In the course of the movement, the holding limbs 88, 94 of the preload spring 72 can be moved under the holding lugs 84, 90 respectively assigned thereto so as to be axially supported on the respective coupling regions 40, 47. Once the state has been reached, the regions of the holding lugs 84, 90 that engage over the assigned holding limbs 88, 94 may be bent slightly in the direction of the respective coupling regions 40, 47 again. Alternatively, the holding lugs 84, 90 may already have been provided with the shaping illustrated in the figures, and the preload spring 72 can be moved under the holding lugs 84, 90 by way of corresponding application of force on the holding limbs 88, 94.

As a result of the arrangement of the preload spring 72 between the two coupling elements 36, 38, in a state preloaded in the peripheral direction, a force which acts on the two coupling elements 36, 38 substantially radially or transversely with respect to one another is also generated in addition to a force action which acts on the coupling elements in the peripheral direction, that is, for rotation with respect to one another substantially about the pivot axis A. FIG. 4 illustrates the approximately radially oriented force F via which the first coupling element 36 is loaded in such a way that the outer peripheral region 44 of the coupling region 40 of the first coupling element is forced, in a region close to the rotational coupling projection 48, in the direction of the rotational coupling fingers 64, 66 of the second coupling element 38.

In order to ensure defined relative positioning of the two coupling elements 36, 38 transversely with respect to the pivot axis A whilst taking account of the force F, and in particular to ensure that the openings 43, 52 of the positively locking engagement formations 42, 50 are positioned with respect to one another and with respect to the pivot axis A in a substantially centered manner, radial support regions 96, 98 are provided on the outer peripheral region 44 of the coupling region 40 of the first coupling element 36 on both sides of the rotational coupling projection 48. Each radial support region 96, 98 includes a radial support projection 100, 102 which is provided with a peripheral spacing to the rotational coupling projection 48 and via which the first coupling element 36 is radially outwardly supported on the rotational coupling fingers 64, 66 positioned on both sides of the rotational coupling projection 48.

By virtue of the fact that, in the case of the coupling arrangement 32, the first coupling element 36 and the second coupling element 38 are not only supported relative to one another in the peripheral direction by the peripheral support regions 76, 78 and counterpart peripheral support regions 80, 82 that bear against one another or are preloaded toward one another, but a radial support is additionally also produced by radially acting contact between the radial support regions 100, 102 and the rotational coupling fingers 64, 66, defined relative positioning of the two coupling elements 36, 38 transversely with respect to the pivot axis A is also ensured in a manner assisted by the preload action of the preload spring 72. Although the additional contact between the two coupling elements 36, 38 in the region of the radial support projections 100, 102 and the rotational coupling fingers 64, 66 introduces additional heat-transmitting contact, which is to be avoided per se, between the two coupling elements 36, 38, defined relative positioning of the two coupling elements 36, 38 that prevents distortion during pivoting operation is ensured.

No radial support regions or radial support projections are provided so as to be assigned to the other rotational coupling projection 46, with the result that, in the peripheral region of the rotational coupling projection 46, the outer peripheral region 44 of the coupling region 40 has a radial spacing to the rotational coupling fingers 60, 62 of the second coupling element 38. As a result, on the one hand, contact between the two coupling elements 36, 38 that leads to additional heat transfer is avoided in the peripheral region. On the other hand, no overdeterminacy in terms of the definition of the position of the two coupling elements 36, 38 transversely with respect to the pivot axis A is introduced. Sufficiently defined positioning is ensured solely by the radial support projections 100, 102 and the force F generated via the preload spring 72.

A further contribution to reduced heat transfer may be made in that T-shaped cutouts 104, 106, the T arms 108 thereof extending substantially along the opening 52 in the plate-like coupling region 47 and the T stems 110 thereof, which proceed from the respective T arm 108, extending from the plate-like coupling region 47 in the direction away from the opening 52 into the transition region to the rotational coupling arms 56, 58 that adjoin the plate-like coupling region 47 and for example also into the rotational coupling arms 56, 58, are formed in the second coupling element 38 on both sides of the opening 52 formed in the plate-like coupling region 47. Each cutout 104, 106 of this kind contributes to a significantly reduced cross section for heat transfer particularly if the cutout extends completely through the construction material of the second coupling element 38.

In the construction of an exhaust-gas flap, and of a coupling arrangement therefor, described above and illustrated in the figures, various aspects can be embodied differently in terms of structure. For instance, it is for example possible for one or both coupling elements to also be firmly connected to the drive element and/or the pivot shaft by frictionally locking engagement or/and material cohesion as an alternative or in addition to the positively locking engagement described above. It goes without saying that the entire coupling arrangement may be integrated in the exhaust-gas flap in an inverse arrangement with respect to FIG. 1, such that the first coupling element is rotationally conjointly connected to the drive element and the second coupling element is rotationally conjointly connected to the pivot shaft. The rotational coupling cutouts that are provided on the second coupling element may also be delimited between respective wall portions which extend over a relatively large region along the outer peripheral region of the coupling region of the second coupling element and which protrude axially from the coupling region. In the context of the present disclosure, a peripheral end region, which is close to a respective rotational coupling cutout, of such a wall portion is to be regarded as a rotational coupling finger.

It is understood that the foregoing description is that of the preferred embodiments of the invention and that various changes and modifications may be made thereto without departing from the spirit and scope of the invention as defined in the appended claims.

What is claimed is:

1. A coupling arrangement for rotationally coupling a drive element of a pivoting drive of an exhaust-gas flap for the exhaust-gas flow of an internal combustion engine to a pivot shaft rotatable about a pivot axis (A), the coupling arrangement comprising:
 a first coupling element having a first coupling region configured for coupling to said pivot shaft for conjoint rotation therewith about said pivot axis (A);
 a second coupling element having a second coupling region configured for coupling to said drive element for conjoint rotation therewith about said pivot axis (A);
 a preload element configured for generating a first force to act upon said first and second coupling elements substantially in a peripheral direction with respect to each other and for generating a second force acting in an axial direction between said first and second coupling elements;
 one of said first and second coupling elements including at least two radially outwardly extending rotational-coupling projections;
 the other one of said first and second coupling elements having rotational-coupling cutouts corresponding to respective ones of said at least two rotational-coupling projections for receiving said at least two rotational-coupling projections;
 each of said cutouts being open axially in a direction away from said coupling region of said other coupling element;
 wherein, for providing a captive retention of said first and second coupling elements, said preload element is configured to hold said one coupling element axially on said other coupling element so as to prevent said rotational-coupling projections from moving out of corresponding ones of said rotational-coupling cutouts wherein said rotational-coupling cutouts are accommodated.

2. The coupling arrangement of claim 1, wherein at least one of the following applies:
 said rotational-coupling projections are positioned so as to be engaged into corresponding ones of said rotational-coupling cutouts when said preload element is in a substantially completely axially relaxed state; and,
 said at least two rotational-coupling projections extend away from each other in a substantially diametrically opposed manner with respect to said pivot axis (A) and are provided on said one coupling element.

3. The coupling arrangement of claim 1, wherein at least one of the following applies:
 said rotational-coupling projections extend radially outward from said coupling region of said one coupling element; and,
 said coupling region of said one coupling element has a substantially plate-like form.

4. The coupling arrangement of claim 1, wherein the coupling region of said other coupling element has a substantially plate-like form.

5. The coupling arrangement of claim 1, wherein the preload element includes: a preload spring having a first support region which is supported at least in a first peripheral direction with respect to said first coupling element and at least axially in the direction of said second coupling element; and, a second support region which is supported at least in a second peripheral direction, opposite to said first peripheral direction, with respect to said second coupling element and at least axially in the direction of said first coupling element.

6. The coupling arrangement of claim 5, wherein at least one of the following applies:
   a) said first support region includes a first holding limb of said preload spring and a holding region of said first coupling element engaging over said first holding limb axially in the peripheral direction; and,
   b) said second support region includes a second holding limb of said preload spring and a holding region of said second coupling element engaging over said second holding limb axially and in peripheral direction.

7. The coupling arrangement of claim 6, wherein at least one of the following applies:
   a) said first coupling region of said first coupling element defines a first outer peripheral region;
      said holding region of said first coupling element includes a first holding lug on said first outer peripheral region; and,
      said first holding lug extends in a curved manner axially and in the peripheral direction; and,
   b) said second coupling region of said second coupling element defines a second outer peripheral region;
      said holding region of said second coupling element includes a second holding lug on said second outer peripheral region; and,
      said second holding lug extends in a curved manner axially and in a peripheral direction.

8. The coupling arrangement of claim 7, wherein said first holding lug on said first coupling region of said first coupling element is curved axially and in the peripheral direction in a manner substantially opposite to said second holding lug on said second coupling region of said second coupling element.

9. The coupling arrangement of claim 6, wherein said preload spring is a helical spring; and, each of said holding limbs is provided by a substantially radially outwardly extending winding end region of the preload spring.

10. The coupling arrangement of claim 1, wherein:
    each of said rotational-coupling projections has a peripheral support region formed thereon;
    each of said rotational-coupling cutouts delimits a counterpart peripheral support region in the peripheral direction; and,
    the peripheral support regions of said rotational-coupling projections are accommodated in corresponding ones of said rotational-coupling cutouts and are preloaded by said preload element so as to abut against the corresponding ones of said counterpart peripheral support regions of the corresponding ones of said rotational-coupling cutouts receiving respective ones of said rotational-coupling projections.

11. The coupling arrangement of claim 1, further comprising a radial support region substantially radially supporting said one coupling element with respect to said other coupling element and being provided on said other coupling element so as to be assigned to at least one of said rotational-coupling projections in the peripheral direction, on at least one side of the rotational-coupling projection.

12. The coupling arrangement of claim 1, wherein at least one of the following applies:
    a) said coupling region of said first coupling element has a positive locking engagement formation for rotational coupling to said pivot shaft; and,
    b) said coupling region of said second coupling element has a positive locking engagement formation for rotational coupling to said drive element.

13. The coupling arrangement of claim 1, wherein the preload element includes: a preload spring having a first support region which is supported at least in a first peripheral direction with respect to said first coupling element and at least axially in the direction of said second coupling element; and, a second support region which is supported at least in a second peripheral direction, opposite to said first peripheral direction, with respect to said second coupling element and at least axially in the direction of said first coupling element;
    said first support region includes a first holding limb of said preload spring and a holding region of said first coupling element engaging over said first holding limb axially in the peripheral direction to hold said first holding limb on said first coupling element; and,
    said second support region includes a second holding limb of said preload spring and a holding region of said second coupling element engaging over said second holding limb axially and in peripheral direction to hold said second holding limb on said second coupling element.

14. A coupling arrangement for rotationally coupling a drive element of a pivoting drive of an exhaust-gas flap for the exhaust-gas flow of an internal combustion engine to a pivot shaft rotatable about a pivot axis (A), the coupling arrangement comprising:
    a first coupling element having a first coupling region configured for coupling to said pivot shaft for conjoint rotation therewith about said pivot axis (A);
    a second coupling element having a second coupling region configured for coupling to said drive element for conjoint rotation therewith about said pivot axis (A);
    a preload element configured for generating a first force to act upon said first and second coupling elements substantially in a peripheral direction with respect to each other and for generating a second force acting in an axial direction between said first and second coupling elements;
    one of said first and second coupling elements including at least two radially outwardly extending rotational-coupling projections;
    the other one of said first and second coupling elements having rotational-coupling cutouts corresponding to respective ones of said at least two rotational-coupling projections for receiving said at least two rotational-coupling projections;
    each of said cutouts being open axially in a direction away from said coupling region of said other coupling element;
    wherein, for providing a captive retention of said first and second coupling elements, said preload element is configured to hold said one coupling element axially on said other coupling element so as to prevent said rotational-coupling projections from moving out of corresponding ones of said rotational-coupling cutouts wherein said rotational-coupling cutouts are accommodated;
    two sets of rotational-coupling fingers extending substantially axially in a direction away from said coupling region of said other coupling element; and,
    each of said sets of rotational-coupling fingers including two fingers conjointly delimiting a corresponding one of said rotational-coupling cutouts therebetween which open axially in a downward direction away from said coupling region of said other coupling element.

15. The coupling arrangement of claim 14, further comprising:
   rotational-coupling arms corresponding to respective ones of said sets of fingers;
   each of said rotational-coupling arms extending substantially axially away from said coupling region of said other coupling element and into the corresponding one of said sets of fingers; and,
   at least one of said arms having an arm cutout formed therein.

16. The coupling arrangement of claim 15, wherein at least one additional cutout is formed in the coupling region of said other coupling element.

17. The coupling arrangement of claim 16, wherein said at least one additional cutout has a T-shape.

18. The coupling arrangement of claim 17, wherein said additional cutout extends in a direction of at least one of said rotational-coupling arms.

19. An exhaust-gas flap assembly including for an exhaust-gas flow of an internal combustion engine passing through a flap pipe defining an interior for accommodating said exhaust-gas flow, the exhaust-gas flap assembly comprising:
   a pivot shaft supported in said flap pipe so as to be pivotable about a pivot axis (A);
   a flap carried in said interior of said flap pipe on said pivot shaft;
   a pivot drive having a drive element; and,
   a coupling arrangement for rotatably coupling said pivot shaft to said drive element;
   said coupling arrangement including:
   a first coupling element having a first coupling region configured for coupling to said pivot shaft for conjoint rotation therewith about said pivot axis (A);
   a second coupling element having a second coupling region configured for coupling to said drive element for conjoint rotation therewith about said pivot axis (A);
   a preload element configured for generating a first force to act upon said first and second coupling elements substantially in a peripheral direction with respect to each other and for generating a second force acting in an axial direction between said first and second coupling elements;
   one of said first and second coupling elements including at least two radially outwardly extending rotational-coupling projections;
   the other one of said first and second coupling elements having rotational-coupling cutouts corresponding to respective ones of said at least two rotational-coupling projections for receiving said at least two rotational-coupling projections;
   each of said cutouts being open axially in a direction away from said coupling region of said other coupling element;
   wherein, for providing a captive retention of said first and second coupling elements, said preload element is configured to hold said one coupling element axially on said other coupling element so as to prevent said rotational-coupling projections from moving out of corresponding ones of said rotational-coupling cutouts wherein said rotational-coupling cutouts are accommodated.

* * * * *